United States Patent Office 2,818,409
Patented Dec. 31, 1957

2,818,409

QUINOPHTHALONE DYES FOR HYDROPHOBIC FIBERS

Frithjof Zwilgmeyer, Wilmington, Del., assignor to E. I. du Pont de Nemours and Company, Wilmington, Del., a corporation of Delaware No Drawing. Application July 25, 1956
Serial No. 599,919

9 Claims. (Cl. 260—270)

This invention relates to novel dyes of the quinophthalone series.

It is an object of this invention to provide novel compounds of the quinophthalone series which are useful either as disperse dyes for hydrophobic fiber broadly or as cationic dyes (basic dyes) for hydrophobic fiber containing nitrogen in its structure, such as nylon or polyacrylonitrile fiber. A further object of this invention is to provide novel disperse dyes for hydrophobic fiber, which may be converted, as by reaction with tertiary bases, into cationic dyes for nitrogenous fiber such as nylon, polyacrylonitrile fiber or wool. A still further object is to provide new colors for hydrophobic fiber in the yellow region of the spectrum, there having been hitherto a particular shortage of satisfactory dyes of this shade for hydrophobic fiber. Various other objects and achievements of this invention will become apparent as the description proceeds.

According to this invention, these objects are achieved by reacting first an amino quinophthalone compound of the formula

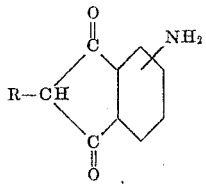

wherein R stands for a 3-hydroxyquinolyl radical such as 3-hydroxy-quinolyl itself or its Bz chloride, bromine or methyl derivatives, with an epihalohydrin of the formula

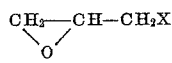

wherein X is a halogen atom, preferably chlorine or bromine, whereby the epoxy ring is opened and the terminal C-atom thereof becomes attached to the N-atom of the amino group.

The resulting condensation products correspond to the formula

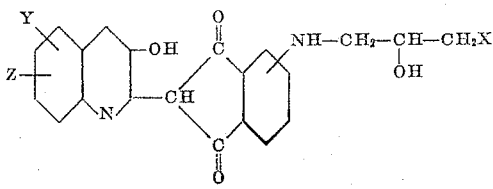

wherein X is halogen, particularly chlorine or bromine, while Y and Z may designate hydrogen, chlorine, bromine or methyl.

Inasmuch, however, as tautomerism is a natural possibility for the amino quinophthalone radical, for instance, the arrangement

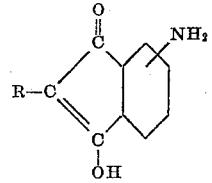

wherein R stands for the hydroxyquinolyl radical and its Bz-substitution derivatives, that is the radical

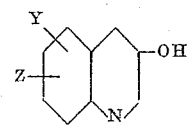

as above defined, it is better to represent said novel condensation products by the general formula

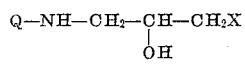

wherein Q represents the nucleus of 3'-hydroxyquinophthalone in any of its tautomeric forms, and wherein the NH-radical is attached to the Bz ring of the phthalyl portion of the quinophthalone nucleus.

The above compounds are useful directly as disperse dyes for various hydrophobic fibers, such as nylon, cellulose acetate, polyacrylonitrile fiber and polyethylene terephthalate fiber. For such purposes, they may be applied in the form of dispersions from aqueous baths in customary manner, the bath usually containing soap or other dispersing agents and optional auxiliary agents.

The said condensation products may however be converted further into water-soluble, cationic compounds by reacting them with tertiary bases, such as trimethyl amine, triethylamine, triethanolamine, propyl-dimethylamine, butyl-dimethylamine, tripropylamine, p-methylbenzyl-dimethylamine, 2-phenylethyl-dimethylamine, diethyl-ethanolamine, ethyl-diethanolamine, or in general any compound of the formula

wherein the various R's are selected from the group consisting of lower alkyl (1 to 4 C-atoms) and hydroxyalkyl (1 to 4 C-atoms), and wherein one of the R's may also be an aralkyl radical. The resulting cationic compounds may be isolated as such or as zinc-chloride double salts. In either form, they may be used as basic dyes for wool, but their special interest resides in their capacity to dye nitrogenous hydrophobic fiber, such as nylon or "Orlon" polyacrylonitrile fiber, in strong yellow shades of good fastness qualities. My novel compounds are stable to hydrolysis in mildly alkaline dye baths, and therefore may be applied to said hydrophobic fibers from acid, neutral or alkaline dye baths.

My novel disperse dyes may also serve as intermediates for other disperse dyes for hydrophobic fibers. Thus, they may be reacted with ammonia or various primary and secondary alkyl, hydroxyalkyl or aralkylamines to produce disperse dyes of basic character, according to the following reactions:

(a)

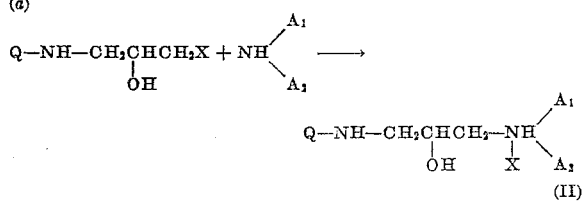

(b)

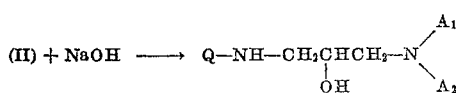

In these equations, $A_1$ and $A_2$ may represent hydrogen, alkyl, hydroxy-alkyl or aralkyl, all the alkyls being preferably of 1 to 4 C-atoms each, and the entire compound $$NH\begin{matrix}A_1\\A_2\end{matrix}$$

may be typified by ammonia, monomethylamine, monoethylamine, monobutylamine, dimethylamine, diethylamine, diethanolamine, ethanol-ethylamine, benzyl-methylamine, 2-phenethyl-methylamine, piperidine and morpholine.

The resulting basic dyes may be applied to hydrophobic fiber in dispersed form from an aqueous bath which is preferably at a pH of between 3 and 8; that is, the bath is acid, neutral or mildly alkaline.

Without limiting this invention, the following examples are given to illustrate my preferred mode of operation. Parts mentioned are by weight.

EXAMPLE 1

(a) *4-(3 - chloro - 2 - hydroxypropylamino)-3'-hydroxyquinophthalone*

42.4 parts of 4-amino-3'-hydroxyquinophthalone (obtained as in Example 1 of my copending application, Serial No. 567,091), 15 parts of zinc chloride, 330 parts of monochlorobenzene, 32 parts of isopropanol and 39 parts of epichlorohydrin are heated to reflux (108° C.) with stirring. The mixture is refluxed for 1.5 to 2 hours, during which time the reflux temperature increases to 112° C. After the mixture is cooled to 10° C., 400 parts of petroleum hydrocarbons (boiling range 30° to 60° C.) are added to precipitate 4-(3-chloro-2-hydroxypropylamino)-3'-hydroxyquinophthalone. The product is filtered, washed with 200 parts of the petroleum hydrocarbons and dried at 50° C. Zinc chloride may be removed by exhaustively extracting the product with water. This compound serves both as a dye and as an intermediate. As a dye, applied in the form of an aqueous dispersion, it produces bright yellow shades on cellulose acetate, nylon, and "Dacron" polyester fibers.

(b) *4-(3-trimethylammonio - 2 - hydroxypropylamino)-3'-hydroxyquinophthalone, chloride*

8.0 parts of 4-(3-chloro-2-hydroxypropylamino)-3'-hydroxyquinophthalone, obtained as in part (a) of this example, are dissolved in a solution of 32 parts of trimethylamine in 220 parts of ethylene glycol. Trimethylamine gas is passed through the solution as it is heated slowly, so that the temperature reaches 95° C. after one hour. The gas is shut off and the solution is stirred at 95° C. for 1.5 hours and then allowed to cool to room temperature. The cooled mass is drowned into 300 parts of warm water containing more than enough acetic acid to neutralize the glycol solution. This solution is filtered and cooled to 20° C. The press cake is discarded. Five parts of zinc chloride and then 60 parts of sodium chloride are dissolved slowly in the filtrate. The filtrate is cooled to 0° to 5° C., allowed to stand 20 hours, and the product is filtered off as the zinc chloride double salt and dried at 50° C. The product dyes "Orlon" acrylic fiber, from an aqueous bath, in yellow shades having excellent fastness properties.

EXAMPLE 2

*4-(3 - triethylammonio - 2 - hydroxypropylamino)-3'-hydroxyquinophthalone, chloride*

7.0 parts of 4-(3-chloro-2-hydroxypropylamino)-3'-hydroxyquinophthalone are heated in 260 parts of o-dichlorobenzene at 100° C. This mixture is filtered to remove insolubles and the residue is discarded. 36 parts of triethylamine are added to the filtrate, and the solution is heated for 8 hours at 120° C. After the mixture is cooled to 25° C., the product is filtered off and washed with 110 parts of warm monochlorobenzene. It is dried at 50° to 60° C. The dye thus obtained produces yellow shades of good fastness on "Orlon" acrylic fiber, from an aqueous dye bath.

EXAMPLE 3

(a) 8 parts of 4-(3-chloro-2-hydroxypropylamino)-3'-hydroxyquinophthalone, 34 parts of triethanolamine, and 16 parts of ethanol are mixed and refluxed for 20 hours. The mixture is drowned into 200 parts of 15% acetic acid and filtered. The press cake is discarded, and 5 parts of zinc chloride are dissolved into the filtrate. 20 parts of sodium chloride are added slowly to the solution, and the latter is stirred at 0° to 5° for 20 hours. The product, 4-(3-[tri(2-hydroxyethyl)ammonio] - 2 - hydroxypropylamino)-3'-hydroxyquinophthalone chloride, zinc chloride double salt, is filtered off and dried at 50° C.

(b) When the triethanolamine in part (a) of this example is replaced by an equivalent amount of N,N-dimethylbenzylamine one obtains the 4-(3-[benzyldimethylammonio] - 2 - hydroxypropylamino)-3'-hydroxyquinophthalone chloride, zinc chloride double salt.

(c) Likewise when the triethanolamine in part (a) of this example is replaced by an equivalent amount of diethyl-(2-hydroxyethyl)amine one obtains the 4-(3-[diethyl(2 - hydroxyethyl)ammonio] - 2 - hydroxypropylamino)-3'-hydroxyquinophthalone chloride, zinc chloride double salt.

The dyes obtained in parts (a), (b) and (c) of this example are all water-soluble, basic dyes which resemble the other cationic dyes disclosed in these examples and produce fast, yellow shades when applied to "Orlon" acrylic fiber from an aqueous dye bath.

EXAMPLE 4

(a) *5 - (3-chloro - 2 - hydroxypropylamino)-3'-hydroxyquinophthalone*

A mixture consisting of 4 parts of 5-amino-3'-hydroxyquinophthalone (Example 4 of my copending application Serial No. 567,091), 100 parts of glacial acetic acid, and 2.4 parts of epichlorohydrin is agitated at 95° to 98° C. for 16 hours and then filtered while hot. The residue is discarded and the filtrate is stirred into 800 parts of water. The drowned mass is cooled below 10° C., treated with 45 parts of sodium chloride and filtered. The filter cake is sucked down and dried to yield the subject product.

(b) *5-(3 - trimethylammonio - 2 - hydroxypropylamino)-3'-hydroxyquinophthalone chloride, zinc chloride complex*

A mixture consisting of 1.4 parts of the dried product obtained in part (a) of this example, 20 parts of ethanol, and 4.4 parts of triethylamine is heated at refluxing temperature for 16 hours. The reaction mass is then drowned into 600 parts of water, acidified to Congo red indicator, using HCl, heated to 90° C., filtered while hot, and the residue is washed with 100 parts of water. The combined filtrate and washing liquor is treated with 1 part of $ZnCl_2$, cooled to 10° C. and salted out with 70 parts of sodium chloride. The precipitated product is filtered off and dried. The cationic dye thus obtained dissolves readily in water and dyes "Orlon" acrylic fiber in yellow shade from an acid, neutral or alkaline aqueous dye bath. The dyeing has excellent light fastness.

It will be understood that the details of the above examples are susceptible of wide variation, without departing from the spirit of this invention. Thus, in lieu of the solvents indicated in the above examples any other inert organic liquid which enables attaining the preferred temperature for the reaction may be employed, for instance monochlorobenzene, dichlorobenzene, trichlorobenzene, toluene, xylene, nitrobenzene, propanol, butanol, ethylene glycol and the lower alkyl ethers (1 to 4 C-atoms) of ethylene glycol.

The temperature of the first part of my process (as in part $a$ of Example 1) may vary from 95° to 135° C. The temperature of condensation with the tertiary base may vary from 75° to 150° C.

Many other variations and modifications will be readily apparent to those skilled in the art.

I claim as my invention:

1. A compound of the group consisting of the ammonium salts of the formula

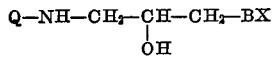

and the zinc chloride double salts thereof, Q in said formula representing the nucleus of a 3'-hydroxyquinophthalone to which the NH radical above shown is attached in the Bz-ring of the phthalyl radical; X representing a halogen atom; and B representing a nitrogenous base radical of the form

wherein $R_2$ and $R_3$ each are selected from the group consisting of alkyl and hydroxyalkyl, while $R_1$ is selected from the group consisting of alkyl, hydroxyalkyl and aralkyl, all alkyls mentioned in these groups having not more than 4 C-atoms each.

2. 5 - (3 - [trimethylammonio] - 2 - hydroxypropylamino) - 3' - hydroxyquinophthalone chloride, zinc chloride double salt.

3. 4 - (3 - [trimethylammonio] - 2 - hydroxypropylamino) - 3' - hydroxyquinophthalone chloride, zinc chloride double salt.

4. The process of producing a compound as defined in claim 1, which comprises reacting with a tertiary nitrogenous base upon a compound of the formula

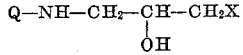

wherein Q represents the nucleus of a 3'-hydroxyquinophthalone to which the NH radical above shown is attached in the Bz ring of the phthalyl radical, while X is a halogen atom, and recovering the compound in the form of its zinc chloride double salt.

5. A process as in claim 4, said tertiary nitrogenous base being a compound of the formula

wherein $R_2$ and $R_3$ each are selected from the group consisting of alkyl and hydroxyalkyl, while $R_1$ is selected from the group consisting of alkyl, hydroxyalkyl and aralkyl, all alkyls mentioned in these groups having not more than 4 C-atoms each.

6. A compound of the formula

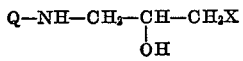

wherein Q is the nucleus of a 3'-hydroxyquinophthalone to which the NH radical above shown is attached in the Bz ring of its phthalyl radical, while X is a halogen atom.

7. The process of producing a compound as defined in claim 6, which comprises condensing an amino 3'-hydroxyquinophthalone, wherein the amino group is located in the Bz ring of the phthalyl radical, with an epihalohydrin of the formula

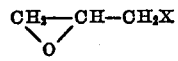

wherein X is a halogen atom, and recovering the condensation product.

8. A process as in claim 7, wherein the condensation is effected by refluxing a mixture of the named reactants in an inert organic liquid and in the presence of an acid reacting condensing agent.

9. A process as in claim 7, wherein the condensation is effected by refluxing a mixture of the named reactants in an inert organic liquid and in the presence of zinc chloride.

No references cited.